United States Patent [11] 3,587,305

| [72] | Inventors | James R. Parkinson<br>Vergennes;<br>Robert W. Gamache, Middlebury, Vt. |
|---|---|---|
| [21] | Appl. No. | 824,442 |
| [22] | Filed | May 14, 1969 |
| [45] | Patented | June 28, 1971 |
| [73] | Assignee | Simmonds Precision Products, Inc.,<br>Tarrytown, N.Y. |

[54] TWO-GEAR, MISALIGNMENT COMPENSATED TORQUE SYSTEM
2 Claims, 1 Drawing Fig.

| [52] | U.S. Cl. | 73/136A |
|---|---|---|
| [51] | Int. Cl. | G01l 3/10 |
| [50] | Field of Search | 73/70.1, 136 |

[56] References Cited
UNITED STATES PATENTS

| 888,371 | 5/1908 | Webb | 73/136 |
|---|---|---|---|
| 2,621,514 | 12/1952 | Waugh | 73/136 |
| 2,675,700 | 4/1954 | Van Degrift et al. | 73/136 |

FOREIGN PATENTS

| 1,135,367 | 12/1956 | France | 73/136 |
|---|---|---|---|
| 920,107 | 3/1963 | Great Britain | 73/136 |

*Primary Examiner*—Charles A. Ruehl
*Attorney*—Edwin E. Greigg

ABSTRACT: In a phase displacement torque measuring system utilizing a pair of exciter wheels mounted in spaced relationship on a shaft and having a pair of transducers mounted adjacent each wheel for generating alternating signals having a phase displacement indicative of the torsional deflection of the shaft. Compensation for shaft misalignment is achieved by arranging the transducers for each exciter wheel 180° apart such that any misalignment in the shaft provides electrical phase shifts of equal and opposite magnitude in the aligned transducers for the two exciter wheels.

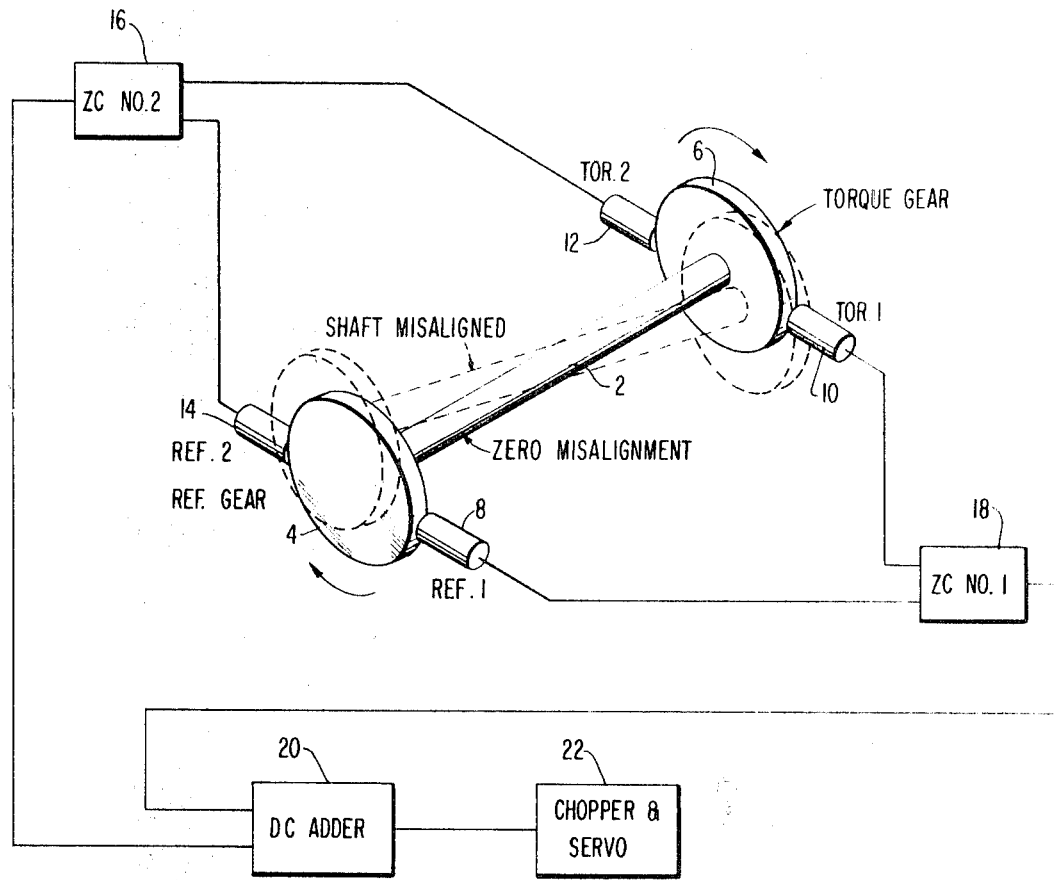
INVENTORS
J. R. PARKINSON
R. W. GAMACHE
ATTORNEY

3,587,305

TWO-GEAR, MISALIGNMENT COMPENSATED TORQUE SYSTEM

This invention relates to an apparatus for measuring torque and more particularly a phase displacement torque measuring system in which a plurality of variable reluctance magnetic pickoffs are positioned adjacent magnetic gears axially displaced on the torque shaft such that phase relationship of the resultant signals is a measure of shaft twist and torque.

When the torque shaft becomes misaligned, that is, out of parallelism with the centerline of the torque pickup transducers, its misalignment will be sensed and displayed as an increase or decrease in transmitted torque. It has been proposed in the assignee's copending application Ser. No. 711,678 that in addition to the normal arrangement of two exciter wheels on the shaft, the torque wheel and the reference wheel, there be provided a third wheel mounted on the shaft such that all the wheels are equally spaced from each other and, further, to provide an additional transducer mounted adjacent the third wheel to generate an alternating signal having a phase displacement indicative of the misalignment of the shaft with respect to the centerline extending through all the transducers. Because of the identical center-to-center distances between the exciter wheels, a shaft misalignment will create identical phase shift changes in opposite directions. These phase shift signals are detected and subsequently cancelled by means of algebraic summation. The DC voltage remaining is then indicative of the component phase shift of the torque composite signal that is linearly and directly related to transmitted torque in the shaft. The purpose of this invention is to simplify the above-described system by retaining the conventional two wheel arrangement and yet provide total compensation for shaft misalignment facilitating, therefore, increased shaft reliability as well as allowing for a much less complex configuration for the torque shaft.

Accordingly, it is an object of this invention to provide a two-wheel misalignment compensated torque system.

It is yet another object of this invention to provide a method for misalignment compensation that employs a unique arrangement of single-pole variable reluctance sensors with respect to a conventional torque wheel reference wheel measurement system.

According to one embodiment utilizing the principles of this invention, there is provided a rotary shaft having a reference exciter wheel and a torque exciter wheel mounted thereon in spaced-apart relationship. Adjacent each wheel is a pair of single-pole variable reluctance sensors, the sensors in each pair being 180° apart about the periphery of its respective exciter wheel. Aligned sensors on one side of the two wheels are paired as a reference and torque input into a zero crossover detector network, whereas the aligned sensors on the other side of the respective wheels are also paired as a reference and torque input into a second zero crossover detector network. The arrangement is such that any shaft misalignment will cause an equal and opposite phase shift signal.

Other objects and advantages will become apparent from a study of the following specification and drawings, in which there is shown schematically the arrangement of circuit elements according to the principles of this invention.

As shown in the drawing, there is provided a shaft 2 having a reference gear wheel 4 and a torque gear wheel 6 of conventional design. Four single-pole variable reluctance sensors 8, 10, 12 and 14 are placed in a single plane and in close proximity to the toothed exciter wheels 4 and 6 as shown, with the sensors 8, 10 forming a reference and torque input and the sensors 12, 14 forming a second reference and torque input. As torque is increased in the shaft 2, the exciter wheels displace in direct proportion. The phase relationship between the sensor signals varies directly as exciter wheel displacement, as well known in the art and described in detail in application Ser. No. 711,678 now U.S. Pat. No. 3,538,762.

In the zero misalignment position of the torque shaft 2, the sensors 8, 10, 12 and 14 will produce precisely the same electrical phase change for a given change in transmitted shaft torque. With the torque shaft in the shaft misaligned condition, as shown in dotted configuration, and with the shaft rotation as shown by the arrows, the electrical phase shift between the torque sensor 12 and the reference sensor 14 is indicative of more shaft torque than is actually present. The electrical phase shift between the reference sensor 8 and the torque sensor 10 is indicative of less shaft torque than is actually present. Because of the placement of both the reference sensors 8 and 14 at 180° apart and both the torque sensors 10 and 12 also at 180° apart, the electrical phase shift produced by shaft misalignment is both equal and opposite and hence will cancel out. The signals from each pair of reference-torque sensors are fed to a first zero crossover detector circuit 16 and a second zero crossover detector circuit 18 as shown. A DC adding circuit 20 forms the display circuitry along with the chopper and servo mechanism 22 which sums the two DC voltages from the detectors 16 and 18 as shaft torque. Consequently, the only motion of the torque shaft that will change the output DC level of the DC adder 20 is a torsional deflection between the shaft mounted gears.

We claim:

1. In a rotary shaft torque measuring system, the combination comprising, a pair of toothed wheels in spaced-apart relationship along said shaft, a first pair of transducers mounted adjacent said wheels for generating first alternating signals in response to rotation of said shaft, said first alternating signals having a phase displacement indicative of the torsional deflection of said shaft, a second pair of transducers mounted adjacent said wheels opposite from and in the same plane as said first pair of transducers for generating second alternating signals in response to rotation of said shaft, said second alternating signals having a phase displacement indicative of the torsional deflection of said shaft, phase detection circuits connected to said first and second pairs of transducers for producing output signals indicative of the phase displacement between said first alternating signals and the phase displacement between said second alternating signals and means for adding the output signals from said phase detection circuits.

2. In a rotary shaft torque measuring system according to claim 1, wherein said phase detection circuits are zero crossover detection circuits.